United States Patent [19]

Ito

[11] Patent Number: 5,425,113
[45] Date of Patent: Jun. 13, 1995

[54] METHOD AND APPARATUS FOR PERFORMING VARIOUS TYPES OF IMAGE PROCESSING IN ONE OPERATION

[75] Inventor: Wataru Ito, Kanagawa, Japan

[73] Assignee: Fuji Photo Film Co., Ltd., Kanagawa, Japan

[21] Appl. No.: 992,821

[22] Filed: Dec. 16, 1992

[30] Foreign Application Priority Data

Dec. 26, 1991 [JP] Japan .................................. 3-345173

[51] Int. Cl.$^6$ ........................... G06T 5/00; G06T 5/50
[52] U.S. Cl. .................................... 382/254; 382/128; 364/413.13; 378/98.2
[58] Field of Search ............... 382/6, 52, 54; 358/111, 358/447; 364/413.13; 378/98.2, 98.8, 98.6, 98.7

[56] References Cited

U.S. PATENT DOCUMENTS

| | | | |
|---|---|---|---|
| 4,258,264 | 3/1981 | Kotera et al. | 250/484 |
| 4,276,473 | 6/1981 | Kato et al. | 250/327.1 |
| 4,315,318 | 2/1982 | Kato et al. | 364/413.13 |
| 4,317,179 | 2/1982 | Kato et al. | 364/413.13 |
| 4,387,428 | 6/1983 | Ishida et al. | 364/413.13 |
| 4,581,535 | 4/1986 | Komaki et al. | 250/327.2 |
| 4,652,999 | 3/1987 | Higashi et al. | 364/413.13 |
| 4,724,489 | 2/1988 | Oldershaw | 358/447 |
| 4,903,205 | 2/1990 | Hishinuma | 382/6 |
| 5,172,418 | 12/1992 | Ito et al. | 382/6 |

FOREIGN PATENT DOCUMENTS

| | | |
|---|---|---|
| 56-11395 | 2/1981 | Japan . |
| 61-5193 | 2/1986 | Japan . |
| 3-276265 | 12/1991 | Japan . |

*Primary Examiner*—Michael T. Razavi
*Assistant Examiner*—Larry J. Prikockis
*Attorney, Agent, or Firm*—Sughrue, Mion, Zinn, Macpeak & Seas

[57] ABSTRACT

When a visible image is reproduced from an image signal Sorg representing an image, a value of an unsharp mask signal Sus corresponding to each picture element in the image is calculated by carrying out an operation expressed as

$$Sus = \Sigma Sorg/(M \times N)$$

on values of image signal components of the image signal Sorg, which image signal components represent the picture elements falling within an area having a size corresponding to $M \times N$ number of picture elements surrounding each of the picture elements in the image. A formula is employed which is expressed as $$S = \gamma(K1 \times Sorg + \beta(Sorg) \times (K2 \times Sorg - D(Sus)))$$

wherein $\gamma(x)$ represents a function with respect to an arbitrary value x, $\beta$ (Sorg) represents a function of an emphasis coefficient with respect to the image signal Sorg, D (Sus) represents an arbitrary function with respect to the unsharp mask signal Sus, and K1 and K2 represent fixed numbers. In the formula, the functions $\beta$ (x), $\beta$ (Sorg), and D (Sus), and the fixed numbers K1 and K2 are changed, and an operation for effecting image processing on the image signal Sorg is thereby carried out.

22 Claims, 3 Drawing Sheets

METHOD AND APPARATUS FOR PERFORMING VARIOUS TYPES OF IMAGE PROCESSING IN ONE OPERATION

BACKGROUND OF THE INVENTION

1. Field of the Invention

This invention relates to a method for processing an image signal representing an image when a visible image is reproduced from the image signal, and an apparatus for carrying Out the image processing method.

2. Description of the Prior Art

Techniques for reading out a recorded image in order to obtain an image signal, carrying out appropriate image processing on the image signal, and then reproducing a visible image by use of the processed image signal have heretofore been known in various fields. For example, as disclosed in Japanese Patent Publication No. 61(1986)-5193, an X-ray image is recorded on an X-ray film having a small gamma value chosen according to the type of image processing to be carried out, the X-ray image is read out from the X-ray film and converted into an electric signal (image signal), and the image signal is processed and then used for reproducing the X-ray image as a visible image on a photocopy, or the like. In this manner, a visible image having good image quality with high contrast, high sharpness, high graininess, or the like, can be reproduced.

Also, when certain kinds of phosphors are exposed to radiation such as X-rays, α-rays, β-rays, γ-rays, cathode rays or ultraviolet rays, they store part of the energy of the radiation. Then when the phosphor which has been exposed to the radiation is exposed to stimulating rays such as visible light, light is emitted by the phosphor in proportion to the amount of energy stored thereon during its exposure to the radiation. A phosphor exhibiting such properties is referred to as a stimulable phosphor.

As disclosed in U.S. Pat. Nos. 4,258,264, 4,276,473, 4,315,318, 4,387,428, and Japanese Unexamined Patent Publication No. 56(1981)-11395, it has been proposed to use stimulable phosphors in radiation image recording and reproducing systems. Specifically, a sheet provided with a layer of the stimulable phosphor (hereinafter referred to as a stimulable phosphor sheet) is first exposed to radiation which has passed through an object, such as the human body. A radiation image of the object is thereby stored on the stimulable phosphor sheet. The stimulable phosphor sheet is then scanned with stimulating rays, such as a laser beam, which cause it to emit light in proportion to the amount of energy stored thereon during its exposure to the radiation. The light emitted by the stimulable phosphor sheet, upon stimulation thereof, is photoelectricaLly detected and converted into an electric image signal. The image signal is then used during the reproduction of the radiation image of the object as a visible image on a recording material such as photographic film, on a display device such as a cathode ray tube CRT) display device, or the like.

Radiation image recording and reproducing systems which use stimulable phosphor sheets are advantageous over conventional radiography using silver halide photographic materials, in that images can be recorded even when the energy intensity of the radiation to which the stimulable phosphor sheet is exposed varies over a wide range. More specifically, since the amount of light which the stimulable phosphor sheet emits when being stimulated varies over a wide range and is proportional to the amount of energy stored thereon during its exposure to the radiation, it is possible to obtain an image having a desirable density regardless of the energy intensity of the radiation to which the stimulable phosphor sheet was exposed. In order to obtain the desired image density, an appropriate read-out gain is set when the emitted light is being detected and converted into an electric signal to be used in the reproduction of a visible image on a recording material, such as photographic film, or on a display device, such as a CRT display device.

In the image recording and reproducing systems, with which image signals are generated and visible images are reproduced from the image signals, the image signals are usually subjected to various types of image processing such that visible images may be obtained which have good image quality and can serve as effective tools in, particularly, the efficient and accurate diagnoses of illnesses. As one of such image processing, gradation processing is known, with which the image density of a reproduced radiation image is adjusted in accordance with the level of the image signal.

Also, frequency processing is carried out on an image signal in order that a visible radiation image having good image quality can be reproduced and used as an effective tool in, particularly, the accurate and efficient diagnosis of an illness. One example of the frequency processing is frequency emphasis processing, such as unsharp mask processing disclosed in, for example, U.S. Pat. Nos. 4,315,318 and 4,317,179. With the frequency emphasis processing, an unsharp mask signal Sus is subtracted from a read-out image signal Sorg, which has been detected from a radiation image. The obtained difference value is multiplied by an emphasis coefficient β. The resulting product is added to the read-out image signal Sorg. In this manner, predetermined spatial frequency components in the image can be emphasized. The frequency emphasis processing is represented by the formula $$S = Sorg + \beta(Sorg - Sus) \tag{1}$$

wherein S represents the signal obtained from the frequency processing, Sorg represents the read-out image signal, Sus represents the unsharp mask signal, and β represents the emphasis coefficient.

Additionally, in order that parts of an image covering as wide a range of image density as possible can be used, the level of contrast of the parts of the image having a high or low image density or the level of contrast of the whole image has heretofore been rendered low such that the difference between the highest image density and the lowest image density may become small, i.e. such that the dynamic range of the image may become narrow. Such processing is disclosed in, for example, U.S. patent application Ser. No. 646,123, now abandoned.

Further, when a radiation image (i.e., a tomographic image) of a tomographic plane is recorded with a tomographic image recording operation described in, for example, U.S. Pat. No. 4,581,535, it often occurs that the amount of transmitted radiation changes sharply at a portion, which is located at a position other than the tomographic plane. In such cases, an image pattern of such a portion occurs as an interfering pattern (or an interfering shadow) in the direction, along which the recording medium moves, and at a center region which is to be used in the radiation image. (Such an interfering pattern will hereinafter be referred to as the "flow pattern.") An image processing method for eliminating the flow pattern is proposed in, for example, Japanese Unexamined Patent Publication No. 3(1991)-276265. With the proposed image processing method, low spatial frequency components corresponding to the flow pattern are removed from the image signal representing the radiation image obtained from the tomographic image recording operation, and an image free of the flow pattern is thereby obtained from the resulting image signal.

Various types of the image processing described above, such as the gradation processing and the frequency processing, are respectively carried out with image processing apparatuses, in which the calculation processes suitable for the respective image processing are stored.

However, if different image processing apparatuses are provided for a plurality of the types of the image processing, the problems will occur in that the calculation processes and the image processing apparatuses cannot be kept simple, and in that the number of the image processing apparatuses cannot be kept small.

SUMMARY OF THE INVENTION

The primary object of the present invention is to provide an image processing method, wherein various types of image processing can be carried out with a single calculation process and with a single apparatus.

Another object of the present invention is to provide an apparatus for carrying out the image processing method.

The present invention provides a first image processing method, in which image processing is carried out on an image signal Sorg representing an image when a visible image is reproduced from the image signal Sorg, the image processing method comprising the steps of:
i) calculating a value of an unsharp mask signal Sus corresponding to each of picture elements in the image by carrying out an operation expressed as $$Sus = \Sigma Sorg/(M \times N)$$

on values of image signal components of the image signal Sorg, which image signal components represent the picture elements falling within an area having a size corresponding to $M \times N$ number of picture elements surrounding each of the picture elements in the image, and
ii) employing a formula $$S = \gamma(K1 \times Sorg + \beta(Sorg) \times (K2 \times Sorg - D(Sus))$$

wherein $\gamma$ (x) represents a function with respect to an arbitrary value x, $\beta$ (Sorg) represents a function of an emphasis coefficient with respect to the image signal Sorg, D (Sus) represents an arbitrary function with respect to the unsharp mask signal Sus, and K1 and K2 represent fixed numbers,
the functions $\gamma$ (x), $\beta$ (Sorg), and D (Sus), and the fixed numbers K1 and K2 being changed in the formula, whereby an operation for effecting image processing on the image signal Sorg is carried out.

The present invention also provides a second image processing method, wherein the first image processing method in accordance with the present invention is modified such that the function $\gamma$ (x) is an arbitrary function, the function $\beta$ (Sorg)=0, the fixed number K1=1, and the image processing is gradation processing.

The present invention additionally provides a third image processing method, wherein the first image processing method in accordance with the present invention is modified such that the function $\gamma$ (x)=x, the function $\beta$ (Sorg) is an arbitrary function, the function D (Sus)=Sus, the fixed numbers K1 and K2 are set as K1=K2=1, the numbers M and N of the picture elements are set as M=N, and the image processing is frequency processing.

The present invention further provides a fourth image processing method, wherein the first image processing method in accordance with the present invention is modified such that the function $\gamma$ (x)=x, the function $\beta$ (Sorg)=1, the function D (Sus) is an arbitrary function, the fixed number K1=1, the fixed number K2=0, the numbers M and N of the picture elements are set as M=N, and the image processing is dynamic range compression processing.

The present invention still further provides a fifth image processing method, wherein the first image processing method in accordance with the present invention is modified such that the function $\gamma$ (x)=x, the function $\beta$ (Sorg) is an arbitrary function, the function D (Sus)=Sus, the fixed numbers K1 and K2 are set as K1=K2=1, either one of the numbers M and N of the picture elements is equal to 1, and the image processing is one-dimensional unsharp mask processing.

The present invention also provides a first image processing apparatus, in which image processing is carried out on an image signal Sorg representing an image, the image processing apparatus comprising:
i) a means for obtaining an unsharp mask signal Sus of the image signal Sorg on the basis of the image signal Sorg,
ii) a means for carrying out an operation on the basis of the unsharp mask signal Sus, the operation being carried out with a formula $$S = \gamma(K1 \times Sorg + \beta(Sorg) \times (K2 \times Sorg - D(Sus))$$

wherein $\gamma$ (x) represents a function with respect to an arbitrary value x, $\beta$ (Sorg) represents a function with respect to the image signal Sorg, D (Sus) represents a function with respect to the unsharp mask signal Sus, and K1 and K2 represent fixed numbers, and
iii) setting means for setting the functions $\gamma$ (x), $\beta$ (Sorg), and D (Sus), and the fixed numbers K1 and K2.

The present invention additionally provides a second image processing apparatus, in which an unsharp mask signal Sus of an image signal Sorg representing an image is obtained on the basis of the image signal Sorg, and an operation for effecting image processing on the image signal Sorg is carried out on the basis of the unsharp mask signal Sus,
the image processing apparatus comprising:
i) an area setting means for setting an area having a size corresponding to $M \times N$ number of picture elements surrounding each of picture elements in the image,
ii) an unsharp mask signal operating means for calculating a value of an unsharp mask signal Sus corresponding to each of the picture elements in the image by carrying out an operation expressed as $$Sus = \Sigma Sorg/(M \times N)$$

on values of image signal components of the image signal Sorg, which image signal components represent the picture elements falling within the area having been set by the area setting means, iii) a D table, which stores a plurality of functions D (Sus) with respect to the unsharp mask signal Sus obtained from the unsharp mask signal operating means, iv) a function D (Sus) setting means for setting a desired function among the plurality of the functions D (Sus) stored in the D table, v) an unsharp mask signal function operating means for carrying out a functional operation for the unsharp mask signal Sus on the basis of the function D (Sus), which has been set by the function D (Sus) setting means, and thereby generating an output representing the value of the function D (Sus), vi) a fixed number K1 setting means for setting a fixed number K1, by which the image signal Sorg is to be multiplied, vii) a fixed number K1 multiplying means for multiplying the image signal Sorg by the fixed number K1, which has been set by the fixed number K1 setting means, viii) a fixed number K2 setting means for setting a fixed number K2, by which the image signal Sorg is to be multiplied, ix) a fixed number K2 multiplying means for multiplying the image signal Sorg by the fixed number K2, which has been set by the fixed number K2 setting means, x) a $\beta$ table, which stores a plurality of functions $\beta$ (Sorg) of an emphasis coefficient with respect to the image signal Sorg, xi) a function $\beta$ (Sorg) setting means for setting a desired function among the plurality of the functions $\beta$ (Sorg) stored in the $\beta$ table, xii) an image signal function operating means for carrying out a functional operation for the image signal Sorg on the basis of the function $\beta$ (Sorg), which has been set by the function $\beta$ (Sorg) setting means, and thereby generating an output representing the value of the function $\beta$ (Sorg), xiii) a subtraction means for subtracting the value of the function D (Sus), which has been obtained from the unsharp mask signal function operating means, from the product of the image signal Sorg and the fixed number K2, which product has been obtained from the fixed number K2 multiplying means, and thereby generating an output representing the value of $K2 \times Sorg - D$ (Sus), xiv) a multiplication means for multiplying the value of the function $\beta$ (Sorg), which has been obtained from the image signal function operating means, by the value of $K2 \times Sorg - D$ (Sus), which has been obtained from the subtraction means, and thereby generating an output representing the value of $\beta$ (Sorg) $\times$ (K2 $\times$ Sorg $-$ D (Sus)), xv) an addition means for adding the value of $\beta$ (Sorg) $\times$ (K2 $\times$ Sorg $-$ D (Sus)), which has been obtained from the multiplication means, to the product of the image signal Sorg and the fixed number K1, which product has been obtained from the fixed number K1 multiplying means, and thereby generating an output representing the value of $K1 \times Sorg + \beta$ (Sorg)33 (K2 $\times$ Sorg $-$ D (Sus)), xvi) a $\gamma$ table, which stores a plurality of functions $\gamma(K1 \times Sorg + \beta(Sorg) \times (K2 \times Sorg - D$ (Sus))) with respect to the value of $K1 \times Sorg + \beta$ (Sorg) $\times$ (K2 $\times$ Sorg $-$ D (Sus)), which has been obtained from the addition means, xvii) a function $\gamma$ setting means for setting a desired function among the plurality of the functions $\gamma$ stored in the $\gamma$ table, and xviii) a function $\gamma$ operating means for carrying out a functional operation for the value of $K1 \times Sorg + \beta$ (Sorg) $\times$ (K2 $\times$ Sorg $-$ D (Sus)), which has been obtained from the addition means, on the basis of the function $\gamma$, which has been set by the function $\gamma$ setting means, and thereby generating an output representing the value of the function $\gamma$ (K1 $\times$ Sorg + $\beta$ (Sorg) $\times$ (K2 $\times$ Sorg $-$ D (Sus)).

With the image processing method and apparatus in accordance with the present invention, the unsharp mask signal Sus is generated from the image signal Sorg representing the image. Thereafter, in the formula $$S = \gamma(K1 \times Sorg + \beta(Sorg) \times (K2 \times Sorg - D (Sus))$$

wherein $\gamma$ (x) represents the function with respect to an arbitrary value x, $\beta$ (Sorg) represents the function of the emphasis coefficient with respect to the image signal Sorg, D (Sus) represents an arbitrary function with respect to the unsharp mask signal Sus, and K1 and K2 represent fixed numbers, the functions $\gamma$ (x), $\beta$ (Sorg), and D (Sus), and the fixed numbers K1 and K2 are changed. In this manner, a plurality of types of image processing are carried out with the single calculation process.

Therefore, by providing the image processing apparatus with the operation means for carrying out the operation with the aforesaid formula and the setting means for setting the functions $\gamma$ (x), $\beta$ (Sorg), and D (Sus), and the fixed numbers K1 and K2, the plurality of types of image processing can be carried out with the single apparatus. In this manner, the calculation process and the image processing apparatus can be kept simple. As a result, a software function or a circuitry in a computer system, in which the image processing method in accordance with the present invention is employed, can be kept simple.

DESCRIPTION OF THE PREFERRED EMBODIMENTS

The present invention will hereinbelow be described in further detail with reference to the accompanying drawings.

Figures 1, 2:
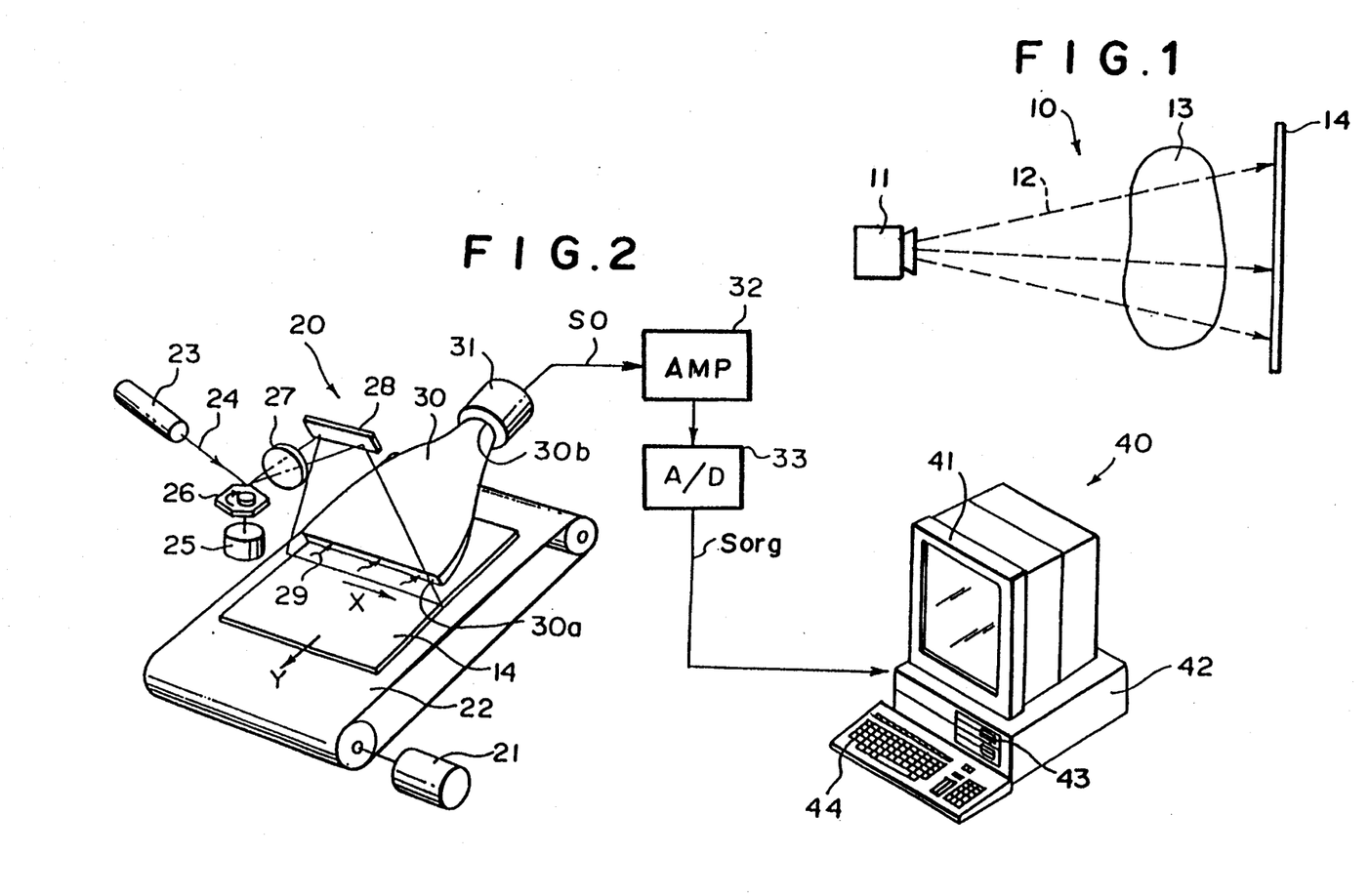
FIG. 1 is a schematic view showing an example of an X-ray image recording apparatus.
FIG. 2 is a perspective view showing an example of an X-ray image read-out apparatus.

FIG. 1 is a schematic view showing an example of an X-ray image recording apparatus.

With reference to FIG. 1, X-rays 12 are produced by an X-ray source 11 of an X-ray image recording apparatus and irradiated to an object 13. The X-rays, which have passed through the object 13, impinge upon a stimulable phosphor sheet 14. In this manner, an X-ray image of the object 13 is stored on the stimulable phosphor sheet 14.

FIG. 2 is a perspective view showing an example of an X-ray image read-out apparatus.

With reference to FIG. 2, a stimulable phosphor sheet 14, on which an X-ray image has been stored in the X-ray image recording apparatus shown in FIG. 1, is placed at a predetermined position in a read-out means 20.

The stimulable phosphor sheet 14 is then conveyed in a sub-scanning direction indicated by the arrow Y by an endless belt 22, which is operated by a motor 21. A laser beam 24, which serves as stimulating rays, is produced by a laser beam source 23, and is reflected and deflected by a rotating polygon mirror 26, which is quickly rotated by a motor 25 in the direction indicated by the arrow. The laser beam 24 then passes through a converging lens 27, which may be constituted of an $f\theta$ lens, or the like. The direction of the optical path of the laser beam 24 is then changed by a mirror 28, and the laser beam 24 impinges upon the stimulable phosphor sheet 14 and scans it in a main scanning direction indicated by the arrow X, which direction is approximately normal to the sub-scanning direction indicated by the arrow Y. When the stimulable phosphor sheet 14 is exposed to the laser beam 24, the exposed portion of the stimulable phosphor sheet 14 emits light 29 in an amount proportional to the amount of energy stored thereon during its exposure to the X-rays. The emitted light 29 is guided by a light guide member 30 and photoelectrically detected by a photomultiplier 31. The light guide member 30 is made from a light guiding material, such as an acrylic plate, and has a linear light input face 30a, positioned so that it extends along the main scanning line on the stimulable phosphor sheet 14, and a ring-shaped light output face 30b, positioned so that it is in close contact with a light receiving face of the photomultiplier 31. The emitted light 29, which has entered the light guide member 30 at its light input face 30a, is guided through repeated total reflection inside of the light guide member 30, emanates from the light output face 30b, and is received by the photomultiplier 31. In this manner, the amount of the emitted light 29, which amount represents the X-ray image, is converted into an electric signal by the photomultiplier 31.

An analog output signal S0 generated by the photomultiplier 31 is logarithmically amplified by a logarithmic amplifier 32, and digitized by an A/D converter 33. In this manner, an image signal Sorg is obtained. The image signal Sorg is then fed into an image processing apparatus 40. The image processing apparatus 40 is constituted of a CRT display device 41, which reproduces and displays a visible image, a main body 42, in which a CPU, an internal memory, an interface, or the like, are incorporated, a floppy disk drive unit 43, which operates a floppy disk, and a keyboard 44, from which necessary information is fed into the X-ray image read-out apparatus.

Information representing the formula shown below is stored in the memory of the image processing apparatus 40.

$$S = \beta\,(K1 \times Sorg + \beta\,(Sorg) \times (K2 \times Sorg - D\,(Sus))) \quad (2)$$

wherein $\gamma(x)$ represents a function with respect to an arbitrary value x, $\beta(Sorg)$ represents a function with respect to the image signal Sorg, $D(Sus)$ represents a function with respect to the unsharp mask signal Sus, and K1 and K2 represent fixed numbers.

Specifically, in the image processing apparatus 40, an operation is carried out with Formula (2) on the image signal Sorg.

Figure 3:
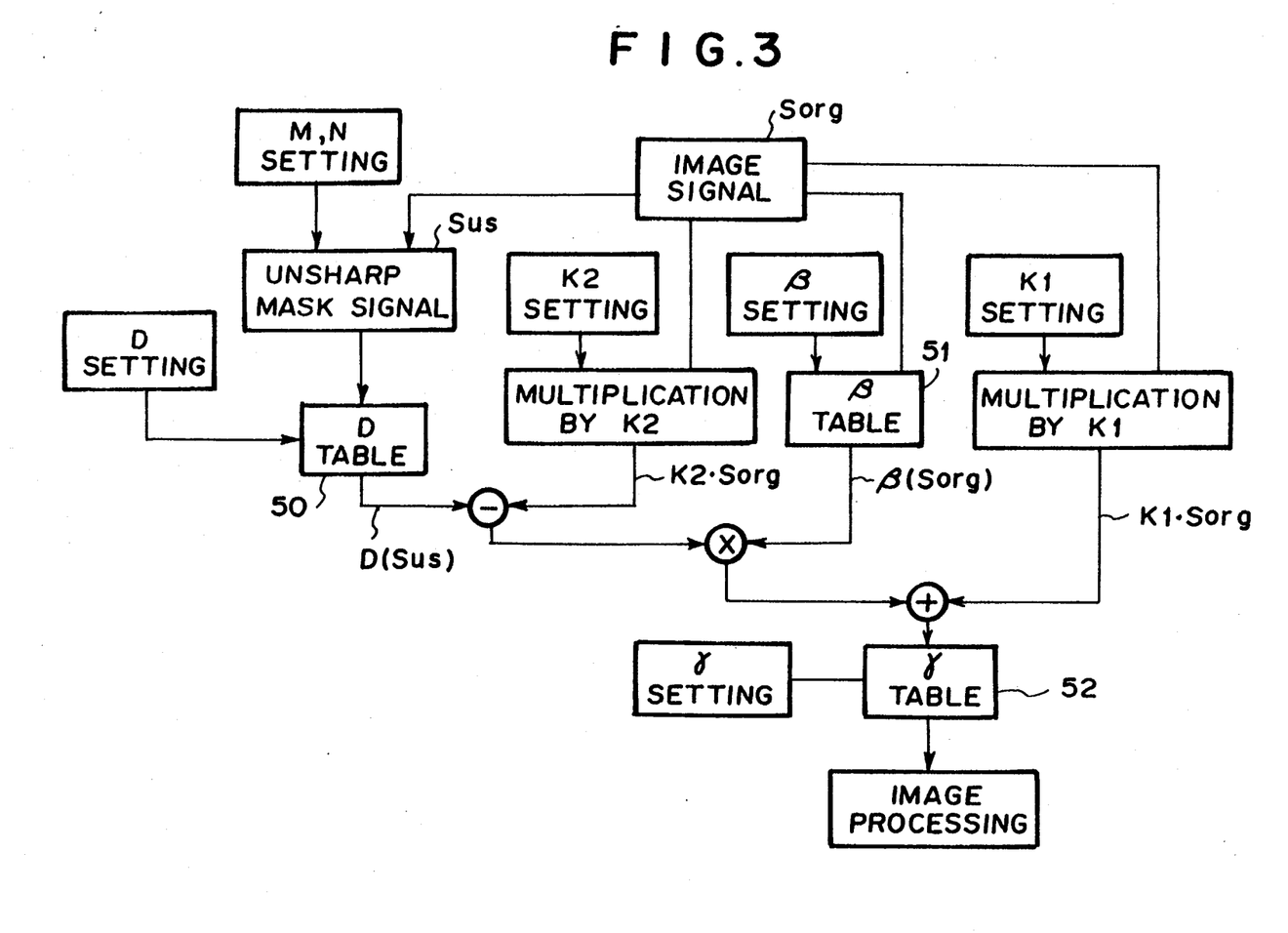
FIG. 3 is a flow chart showing an embodiment of the image processing method in accordance with the present invention.

FIG. 3 is a flow chart showing steps carried out in accordance with Formula (2).

When the image signal Sorg is fed into the image processing apparatus 20, the unsharp mask signal Sus of the image signal Sorg is generated. How the unsharp mask signal Sus is obtained will be described hereinbelow.

Figure 4:
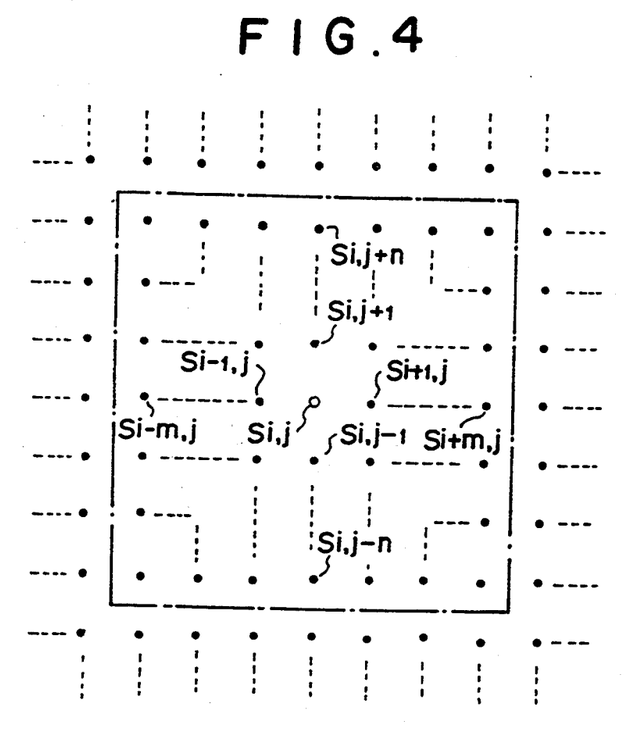
FIG. 4 is an explanatory view showing picture elements in an image and image signal components of an image signal Sorg corresponding to the picture elements.

FIG. 4 is an explanatory view showing picture elements in an image and image signal components of the image signal Sorg, which represent the picture elements. In FIG. 4, dots represent the picture elements, and the symbols such as Si,j represent the image signal components of the original image signal Sorg which represent the corresponding picture elements.

The value of an unsharp mask signal $Sus^{ij}$ for the picture element, which is located in the middle of the region surrounded by the chained line, is calculated with the formula $$Sus^{ij} = \frac{\sum_{k=-m}^{m} \sum_{l=-n}^{n} S_{i+k, j+l}}{M \cdot N} \quad (3)$$

By carrying out the calculation for every picture element, an unsharp mask signal Sus for the whole image is generated. The values of M and N are determined arbitrarily in accordance with the intervals, with which the original image signal Sorg is sampled, the characteristics of the original X-ray image, the type of the desired image processing, or the like. The information representing the values of M and N is fed from the keyboard 44 of the image processing apparatus 40.

After the unsharp mask signal Sus is obtained, an instruction is given from the keyboard 44 in order to select a desired function $D(Sus)$ from a D table 50. The D table 50 stores information about a plurality of functions $D(Sus)$ with respect to the unsharp mask signal Sus. A functional operation on the unsharp mask signal Sus is then carried out on the basis of the selected function $D(Sus)$, and the value of the function $D(Sus)$ is thereby obtained.

Information representing the fixed numbers K1 and K2, by which the image signal Sorg is to be multiplied, is fed from the keyboard 44. The image signal Sorg is multiplied by the fixed numbers K1 and K2, and the value of $K1 \times Sorg$ and the value of $K2 \times Sorg$ are thereby obtained.

Also, information representing a desired function $\beta(Sorg)$ of an emphasis coefficient with respect to the image signal Sorg is fed from the keyboard 44. The desired function $\beta(Sorg)$ of the emphasis coefficient is thus selected from a $\beta$ table 51, which stores information representing a plurality of functions $\beta(Sorg)$ of the emphasis coefficient. A functional operation of the image signal Sorg is carried out on the basis of the selected function $\beta(Sorg)$, and the value of the function $\beta(Sorg)$ is thereby obtained.

Thereafter, the value of the function D (Sus) is subtracted from the value of K2×Sorg, and the value of K2×Sorg−D (Sus) is thereby obtained. The value of the function β (Sorg) is thereafter multiplied by the value of K2×Sorg−D (Sus), and the value of β (Sorg)×(K2×Sorg−D (Sus)) is thereby obtained. The value of β (Sorg)×(K2×Sorg−D (Sus)) is then added to the value of K1×Sorg, and the value of K1×Sorg+β (Sorg)×(K2×Sorg−D (Sus)) is thereby obtained. After the value of K1×Sorg+β (Sorg)×(K2×Sorg− D (Sus)) is thus obtained, a desired function γ is selected from a γ table 52 in accordance with an instruction given from the keyboard 44. The γ table 52 stores information about a plurality of functions γ with respect to the value of K1×Sorg+β (Sorg)×(K2×Sorg−D (Sus)). A functional operation for the value of K1×Sorg+β (Sorg)×(K2×Sorg−D (Sus)) is then carried out on the basis of the selected function γ. In this manner, the value of the function γ (K1×Sorg+β (Sorg)×(K2×Sorg−D (Sus)) is obtained and is employed as the value of an image signal obtained from the desired image processing.

In cases where gradation processing is to be carried out on the image signal Sorg, instructions are given from the keyboard 44 such that the function γ (x) is an arbitrary function, the function β (Sorg)=0, and the fixed number K1=1. As a result, Formula (2) gives $$S = \gamma(Sorg) \qquad (4)$$

The gradation processing is thus carried out with Formula (4) on the image signal Sorg.

In cases where frequency processing is to be carried out on the image signal Sorg, instructions are given from the keyboard 44 such that the function γ (x)=x, the function β (Sorg) is an arbitrary function, the function D (Sus)=Sus, the fixed numbers K1 and K2 are set as K1=K2=1, and the numbers M and N of the picture elements are set as M=N. As a result, Formula (2) gives $$S = Sorg + \beta(Sorg) \times (Sorg - Sus) \qquad (5)$$

The frequency processing is thus carried out with Formula (5) on the image signal Sorg.

In cases where dynamic range compression processing is to be carried out on the image signal Sorg, instructions are give from the keyboard 44 such that the function γ (x)=x, the function β (Sorg)=1, the function D (Sus) is an arbitrary function, the fixed number K1=1, the fixed number K2=0, and the numbers M and N of the picture elements are set as M=N. As a result, Formula (2) gives $$S = Sorg - D(Sus) \qquad (6)$$

The dynamic range compression processing is thus carried out with Formula (6) on the image signal Sorg.

In cases where one-dimensional unsharp mask processing is to be carried out on the image signal Sorg in order to, for example, eliminate a flow pattern from a radiation image obtained from a tomographic image recording operation, instructions are given from the keyboard 44 such that the function γ (x)=x, the function β (Sorg) is an arbitrary function, the function D (Sus)=Sus, the fixed numbers K1 and K2 are set as K1=K2=1, and either one of the numbers M and N of the picture elements is equal to 1. As a result, the formula $$S = Sorg + \beta(Sorg) \times (Sorg - Sus) \qquad (7)$$

The one-dimensional unsharp mask processing is thus carried out with Formula (7) on the image signal Sorg.

In the manner described above, an image signal S is obtained from the desired image processing. The image signal S is then fed into an image reproducing apparatus (not shown) and used during the reproduction of a visible image.

The image reproducing apparatus may be a display means, such as a cathode ray tube display device, or a recording apparatus for recording an image on a photographic film by scanning it with a light beam. Alternatively, the image reproducing apparatus may be replaced by an apparatus for storing an image signal on a storage device, such as an optical disk or a magnetic disk.

In the embodiment described above, when the unsharp mask signal Sus is obtained, information representing the values of M and N in Formula (3) is entered from the keyboard 44. Alternatively, the values of M and N may be kept constant, and the unsharp mask signal Sus may thereby be obtained.

Also, in the embodiment described above, the gradation processing, the frequency processing, the dynamic range compression processing, and the one-dimensional unsharp mask processing are employed as the image processing to be carried out on the image signal Sorg. However, no limitation is imposed on the type of the image processing. Any of other types of image processing may be carried out by changing the functions γ, β (Sorg), and D (Sus), and the fixed numbers K1 and K2.

In the embodiment described above, an X-ray image is read out from a stimulable phosphor sheet, and an image signal is thereby generated. The image processing method and apparatus in accordance with the present invention are broadly applicable when image signals are detected from various kinds of recording media, on which images have been recorded, e.g. when an X-ray image is read out from X-ray film.

What is claimed is:

1. An image processing method, in which image processing is carried out on an image signal Sorg representing an image when a visible image is reproduced from the image signal Sorg, the image processing method comprising the steps of:
i) scanning a recording material to photoelectrically detect an image physically contained thereon
ii) generating an analog output signal $S_0$ according to said photoelectrical detection,
iii) amplifying said analog output signal to obtain an amplified signal,
iv) converting said amplified signal into an image signal Sorg,
v) generating an unsharp mask signal Sus corresponding to each of picture elements in the image by carrying out a first operation expressed as $$Sus = \Sigma Sorg/(M \times N)$$

on image signal components of the image signal Sorg, which image signal components represent the picture elements falling within an area having a size corresponding to M×N number of picture elements surrounding each of said picture elements in the image, and vi) carrying out a second operation on said image signal Sorg in accordance with a formula $$S = \gamma(K1 \times Sorg + \beta(Sorg) \times (K2 \times Sorg - D(Sus)))$$

wherein said carrying out of said second operation yields an image signal S for use during reproduction of a visible image wherein $\gamma(x)$ represents a function with respect to an arbitrary value x, $\beta$ (Sorg) represents a function of an emphasis coefficient with respect to the image signal Sorg, D (Sus) represents an arbitrary function with respect to said unsharp mask signal Sus, and K1 and K2 represent fixed numbers, said functions $\gamma$ (s), B (Sorg), and D (Sus), and said fixed numbers K1 and K2 being changed in said formula, whereby an operation for effecting image processing on the image signal Sorg is carried out vii) feeding said image signal S into an image reproducing apparatus, viii) reproducing a visible image signal accordance with said image signal S.

2. A method as defined in claim 1 wherein said function $\gamma$ (x) is an arbitrary function, said function $\beta$ (Sorg)=0, said fixed number K1=1, and the image processing is gradation processing.

3. A method as defined in claim 1 wherein said function $\gamma$ (x)=x, said function $\beta$ (Sorg) is an arbitrary function, said function D (Sus)=Sus, said fixed numbers K1 and K2 are set as K1=K2=1, said numbers M and N of the picture elements are set as M=N, and the image processing is frequency processing.

4. A method as defined in claim 1 wherein said function $\gamma$ (x)=x, said function $\beta$ (Sorg)=1, said function D (Sus) is an arbitrary function, said fixed number K1=1, said fixed number K2=0, said numbers M and N of the picture elements are set as M=N, and the image processing is dynamic range compression processing.

5. A method as defined in claim 1 wherein said function $\gamma$ (x)=x, said function $\beta$ (Sorg) is an arbitrary function, said function D (Sus)=Sus, said fixed numbers K1 and K2 are set as K1=K2=1, either one of said numbers M and N of the picture elements is equal to 1, and the image processing is one-dimensional unsharp mask processing.

6. A method as defined in claim 1 wherein said image is a radiation image.

7. A method as defined in claim 6 wherein said radiation image has been stored on a stimulable phosphor sheet.

8. A method as defined in claim 7 wherein an image signal, which represents said radiation image and serves as said image signal Sorg, is detected by exposing said stimulable phosphor sheet to stimulating rays, which cause said stimulable phosphor sheet to emit light in proportion to the amount of energy stored thereon during its exposure to radiation, and photoelectrically detecting the emitted light.

9. A method as defined in claim 8 wherein said stimulating rays are a laser beam.

10. A method as defined in claim 1 wherein said image is an X-ray image which has been recorded on photographic film.

11. An image processing apparatus, in which image processing is carried out on an image signal Sorg representing an image, the image processing apparatus comprising:

i) means for scanning a recording material to photoelectrically detect an image physically contained thereon, ii) means for generating an analog output signal $S_0$ in accordance with said photoelectrical detection, iii) means for amplifying said analog output signal to obtain an amplified signal, iv) means for converting said amplified signal into an image signal sorg, v) a means for accepting said image signal (Sorg) into said image processing apparatus, vi) a means for obtaining an unsharp mask signal Sus of the image signal Sorg on the basis of the image signal Sorg, viii a means for carrying out an operation on the basis of said unsharp mask signal Sus, said operation being carried out in accordance with a formula $$S = \gamma(K1 \times Sorg + \beta(Sorg) \times (K2 \times Sorg - D(Sus)))$$

wherein $\gamma$ (x) represents a function with respect to an arbitrary value x, $\beta$ (Sorg) represents a function with respect to the image signal Sorg, D (Sus) represents a function with respect to said unsharp mask signal Sus, K1 and K2 represent fixed numbers, and s represents a signal for use during reproduction of a visible image and viii) setting means for setting said functions $\gamma$ (x), $\beta$ (Sorg), and D (Sus), and said fixed numbers K1 and K2.

12. An apparatus as defined in claim 11 wherein said image is a radiation image.

13. An apparatus as defined in claim 12 wherein said radiation image has been stored on a stimulable phosphor sheet.

14. An apparatus as defined in claim 13 wherein an image signal, which represents said radiation image and serves as said image signal Sorg, is detected by exposing said stimulable phosphor sheet to stimulating rays, which cause said stimulable phosphor sheet to emit light in proportion to the amount of energy stored thereon during its exposure to radiation, and photoelectrically detecting the emitted light.

15. An apparatus as defined in claim 14 wherein said stimulating rays are a laser beam.

16. An apparatus as defined in claim 11 wherein said image is an X-ray image which has been recorded on photographic film.

17. An image processing apparatus, in which an unsharp mask signal Sus of an image signal Sorg representing an image is obtained on the basis of the image signal Sorg, and an operation for effecting image processing on the image signal Sorg is carried out on the basis of the unsharp mask signal Sus, the image processing apparatus comprising:

i) means for scanning a recording material to photoelectrically detect an image physically contained thereon, ii) means for generating an analog output signal $S_0$ in accordance with said photoelectrical detection, iii) means for amplifying said analog output signal to obtain an amplified signal, iv) means for converting said amplified signal into an image signal Sorg, v) an area setting means for setting an area having a size corresponding to M×N number of picture elements surrounding each of picture elements in the image, vi) an unsharp mask signal generating means for generating a value of an unsharp mask signal Sus corresponding to each of said picture elements in the image by carrying out an operation expressed as $$Sus = \Sigma Sorg/(M \times N)$$

on values of image signal components of the image signal Sorg, which image signal components represent the picture elements falling within said area having been set by said area setting means, vii) a D table, which stores a plurality of functions D (Sus) with respect to said unsharp mask signal Sus obtained from said unsharp mask signal operating means, viii) a function D (Sus) setting means for setting a desired function among the plurality of said functions D (Sus) stored in said D table, ix) an unsharp mask signal function operating means for carrying out a functional operation for said unsharp mask signal Sus on the basis of said function D (Sus), which has been set by said function D (Sus) setting means, and thereby generating an output representing the value of said function D (Sus), x) a fixed number K1 setting means for setting a fixed number K1, by which the image signal Sorg is to be multiplied, xi) a fixed number K1 multiplying means for multiplying the image signal Sorg by said fixed number K1, which has been set by said fixed number K1 setting means, xii) a fixed number K2 setting means for setting a fixed number K2, by which the image signal Sorg is to be multiplied, xiii) a fixed number K2 multiplying means for multiplying the image signal Sorg by said fixed number K2, which has been set by said fixed number K2 setting means, xiv) a $\beta$ table, which stores a plurality of functions $\beta$ (Sorg) of an emphasis coefficient with respect to the image signal Sorg, xv) a function $\beta$ (Sorg) setting means for setting a desired function among the plurality of said functions $\beta$ (Sorg) stored in said $\beta$ table, xvi) an image signal function operating means for carrying out a functional operation for the image signal Sorg on the basis of said function $\beta$ (Sorg) setting means, and thereby generating an output representing the value of said function $\beta$ (Sorg), xvii) a subtraction means for subtracting the value of said function D (Sus), which has been obtained from said unsharp mask signal function operating means, from the product of the image signal Sorg and said fixed number K2, which product has been obtained from said fixed number K2 multiplying means, and thereby generating an output representing the value of K2×Sorg−D (SUS), xviii) a multiplication means for multiplying the value of said function $\beta$ (Sorg), which has been obtained from said image signal function operating means, by the value of K2×Sorg−D (Sus), which has been obtained from said subtraction means, and thereby generating an output representing the value of $\beta$ (Sorg)×(K2×Sorg−D (Sus)), xix) an addition means for adding the value of $\beta$ (Sorg)×(K2×Sorg−D−(Sus)), which has been obtained from said multiplication means, to the product of the image signal Sorg and said fixed number K1, which product has been obtained from said fixed number K1 multiplying means, and thereby generating an output representing the value of K1×Sorg+$\beta$ (Sorg)×(K2×Sorg−D (SUS)), xx) a $\gamma$ table, which stores a plurality of functions $\gamma$ (K1×Sorg+$\beta$ (Sorg)×(K2×Sorg−D (Sus))) with respect to the value of K1×Sorg+$\beta$ (Sorg)×(K2×Sorg−D (Sus)), which has been obtained from said addition means, xxi) a function $\gamma$ setting means for setting a desired function among the plurality of said functions $\gamma$ stored in said $\gamma$ table, and xxii) a function $\gamma$ operating means for carrying out a functional operation for the value of K1×Sorg+$\beta$ (Sorg)×(K2×Sorg−D (Sus)), which has been obtained from said addition means, on the basis of said function $\gamma$, which has been set by said function $\gamma$ setting means, and thereby generating an output signal representing the value of said function $\gamma$ (K1×Sorg+$\beta$ (Sorg)×(K2×Sorg−D (Sus)))

xxiii) means for feeding said output signal into an image reproducing apparatus, xxiv) means for reproducing a visible image in accordance with said output signal.

18. An apparatus as defined in claim 17 wherein said image is a radiation image.

19. An apparatus as defined in claim 18 wherein said radiation image has been stored on a stimulable phosphor sheet.

20. An apparatus as defined in claim 19 wherein an image signal, which represents said radiation image and serves as said image signal Sorg, is detected by exposing said stimulable phosphor sheet to stimulating rays, which cause said stimulable phosphor sheet to emit light in proportion to the amount of energy stored thereon during its exposure to radiation, and photoelectrically detecting the emitted light.

21. An apparatus as defined in claim 20 wherein said stimulating rays are a laser beam.

22. An apparatus as defined in claim 17 wherein said image is an X-ray image which has been recorded on photographic film.

* * * * *